US006663732B1

(12) United States Patent
Link

(10) Patent No.: US 6,663,732 B1
(45) Date of Patent: Dec. 16, 2003

(54) PROCESS FOR MAKING AN INDIVIDUALIZED PUZZLE COLLAGE

(76) Inventor: Donald J. Link, 1053 Legion St., Shakopee, MN (US) 55379

(*) Notice: Subject to any disclaimer, the term of this patent is extended or adjusted under 35 U.S.C. 154(b) by 119 days.

(21) Appl. No.: 09/892,292

(22) Filed: Jun. 26, 2001

Related U.S. Application Data

(60) Provisional application No. 60/219,969, filed on Jul. 21, 2000.

(51) Int. Cl.[7] .......................... B32B 31/00; A63F 9/10

(52) U.S. Cl. ..................... 156/63; 273/156; 273/157 R; 273/157 A

(58) Field of Search .......................... 156/63; 273/156, 273/157 R, 157 A; A63F 9/10

(56) References Cited

U.S. PATENT DOCUMENTS

| | | | | |
|---|---|---|---|---|
| 2,328,281 A | * | 8/1943 | Jones | 430/496 |
| 2,586,039 A | | 2/1952 | Heggedal | |
| 3,364,598 A | | 1/1968 | Cook | |
| 3,574,017 A | | 4/1971 | Kass | |
| 3,854,726 A | | 12/1974 | Balder | |
| 3,964,750 A | * | 6/1976 | Brown | 273/157 R |
| 4,053,159 A | * | 10/1977 | Kulak | 273/157 R |
| 4,586,714 A | | 5/1986 | Lenkoff et al. | |
| 4,940,153 A | * | 7/1990 | Pilgrim, Jr. | 156/63 |
| 5,149,570 A | * | 9/1992 | Cain | 273/153 R |
| 5,156,698 A | | 10/1992 | Roberts | |
| 5,232,088 A | | 8/1993 | Leondidis | |
| 5,865,928 A | | 2/1999 | Lariviere, Jr. et al. | |
| 5,988,687 A | * | 11/1999 | Krisch | 281/51 |

FOREIGN PATENT DOCUMENTS

| | | | | |
|---|---|---|---|---|
| DE | 2430512 | A1 | * | 1/1976 |
| FR | 2643855 | A1 | * | 9/1990 |
| FR | 2653350 | A1 | * | 4/1991 |
| GB | 2256372 | A | * | 12/1992 |
| GB | 2333736 | A | * | 8/1999 |
| WO | WO-01/66206 | A2 | * | 9/2001 |

* cited by examiner

*Primary Examiner*—Jeff H. Aftergut

(74) *Attorney, Agent, or Firm*—Gable & Gotwals; Paul N. Johnson

(57) ABSTRACT

A system for making a picture puzzle collage from a collection of individual photographs each having a picture displaying front surface and a rear surface including a board, a plurality of removable mating contiguous puzzle pieces that fit together in a format to cover the board, adhesive covering the front surface of each puzzle piece and a removable film covering each adhesive covered puzzle piece front surface that when removed from each puzzle piece permits the rearward surface of each of the individual photographs to be affixed thereto and permits excess of each photograph affixed to a puzzle piece to be trimmed away leaving each of the puzzle pieces with a portion of one of the individual photographs thereon, the puzzle pieces when trimmed can then be assembled in a contiguous format on the board.

3 Claims, 4 Drawing Sheets

PROCESS FOR MAKING AN INDIVIDUALIZED PUZZLE COLLAGE

REFERENCE TO PENDING APPLICATIONS

This application is based on Provisional Application Ser. No. 60/219,969 entitled, "A SYSTEM FOR MAKING AN INDIVIDUALIZED PUZZLE COLLAGE" filed on Jul. 21, 2000.

The application is not related to any other pending United States or international patent applications.

BACKGROUND OF THE INVENTION

Making collages is a popular hobby. Generally speaking, a collage involves the random placement of irregular shaped cut-outs of pictures, photographs and other graphic materials to create a theme or a storyboard. The typical collage is formed of hand made cut-outs that are placed adjacent to each other or assembled together with irregular gaps between the pieces. The appeal of a collage is based on the irregular-shaped depiction of different scenes, different pictures or different events that, when compiled together, form a story or set a theme that is pleasing to the eye.

Another highly popular and enjoyable pastime that has endured for generations is assembling puzzles. The typical puzzle is different from a collage in that a puzzle is usually formed of preciously cut interlocking pieces that when assembled form a complete autogenous picture. Puzzles are readily commercially available and are generally constructed by printing a high quality photograph or drawing onto a cardboard base and stamping out the individual puzzle pieces with a steel rule die. Puzzles can be made of thicker material by continuous cutting such as with a scroll saw or jigsaw to create varying numbers of interlocking puzzle pieces. A well made puzzle when assembled has pieces that interlock so preciously that the individual puzzle pieces do not distract a great deal from the quality of the picture when the puzzle is completed.

Taking photographs is another hobby that is enjoyed by a high percentage of people throughout the world. The most common means to memorialize an event such as a wedding, a family reunion, a vacation trip, Christmas or other holiday party, and virtually every other type of event that is meaningful to people, is by the use of photographs. Most such photographs are made by the participants although for some occasions such as weddings, commercial photographers are frequently employed. In any event, irrespective of the source, photographs are a common way to help people remember a time, place or event. For this reason, photography has enjoyed perpetual popularity from the time it first became available to the purchasing public.

The invention herein provides a way for an individual to use these three highly popular hobbies together—that is, making collages, assembling puzzles and memorializing events or experiences with photography.

The invention herein provides a system for forming a collage of individual puzzle pieces each having thereon a portion of an individual photograph in a manner making it easy and convenient for an individual to produce a memorable lasting display—that is, a collage, a puzzle and a photographic record of a place or event.

Others have provided somewhat similar concepts and for background information about the creative efforts of others in this field, reference may be had to the following previously issued United States patents:

| U.S. Pat. No. | INVENTOR | TITLE |
|---|---|---|
| 2,586,039 | Heggedal | Combination Display or Supporting Board and Attaching Parts |
| 3,364,598 | Cook | Composite Pictures |
| 3,574,017 | Kass | Ornamental System |
| 3,854,726 | Balder | Screened Photograph Puzzle |
| 4,586,714 | Lenkoff et al. | Puzzle Game |
| 5,149,570 | Cain | Peel-Off Puzzle |
| 5,156,698 | Roberts | Integral Packaging for Puzzle Postcard and Other Products and Method of Making |
| 5,232,088 | Leondidis | Greeting Card Puzzle Kit |
| 5,865,928 | Larivierre, Jr. et al. | Photographs and Other Graphic Materials Custom Cut into Interlocking Puzzle Shapes to Construct a Collage-Puzzle |

BRIEF SUMMARY OF THE INVENTION

The present invention relates to a system for making a puzzle using personal photographs. One aspect of the invention can be practiced by providing a kit that an individual can utilize for making a puzzle in which each of the individual puzzle pieces is a part of a photographic collage. The kit typically contains a puzzle board having removable puzzle pieces; a pin knife, a fingernail-type file and a felt tip marker. A further item that may be included is a piece of glass, masonite, or similar item to serve as a cutting board.

Further, the present invention provides a method of making a puzzle picture collage from a collection of individual photographs each having a picture displaying front surface and a rear surface. Such collection of photographs can typically arise as a result of pictures taken on a vacation, trip, at a wedding, anniversary, birthday and so forth. To practice the method, a board A is provided having a plurality of removable mating contiguous puzzle pieces that fit together to cover at least a substantial portion of the board. Each puzzle piece has a circumferential edge. To initiate the sequence of steps to practice the invention, the puzzle pieces are first removed from the board.

A next step in making the picture puzzle collage is to remove a film covering from a front surface of each of the puzzle pieces to expose an adhesive covered front surface. The film may typically be a transparent plastic film that is held in place by the adhesive front surface of each puzzle piece but that is easily removed from the adhesive front surface without disturbing the adhesive which remains secured to the puzzle piece front surfaces.

Thereafter, a next step in the method is to affix a rearward surface of an individual photograph to the adhesive covered front surface of each puzzle piece. This is accomplished by pressing each photograph onto a puzzle piece so that a portion of the photograph extends beyond the full circumferential edge of the puzzle piece.

A next step in the method is to trim away portions of each photograph secured to a puzzle piece that extends beyond the puzzle piece circumferential edge. This can effectively be done with a knife or with small scissors. Thereafter, the edge of the puzzle piece may be shaped such as by the use of sandpaper. After shaping, the edge may, if desired, be colored.

After carrying out the sequence of steps on each of the puzzle pieces, the puzzle pieces are then placed back onto the board in their original positions so that they contiguously mate together to cover at least a substantial portion of the board.

A better understanding of the invention will be obtained from the following description and claims taken in conjunction with the attached drawings.

DETAILED DESCRIPTION OF A PREFERRED EMBODIMENT

Figure 1:
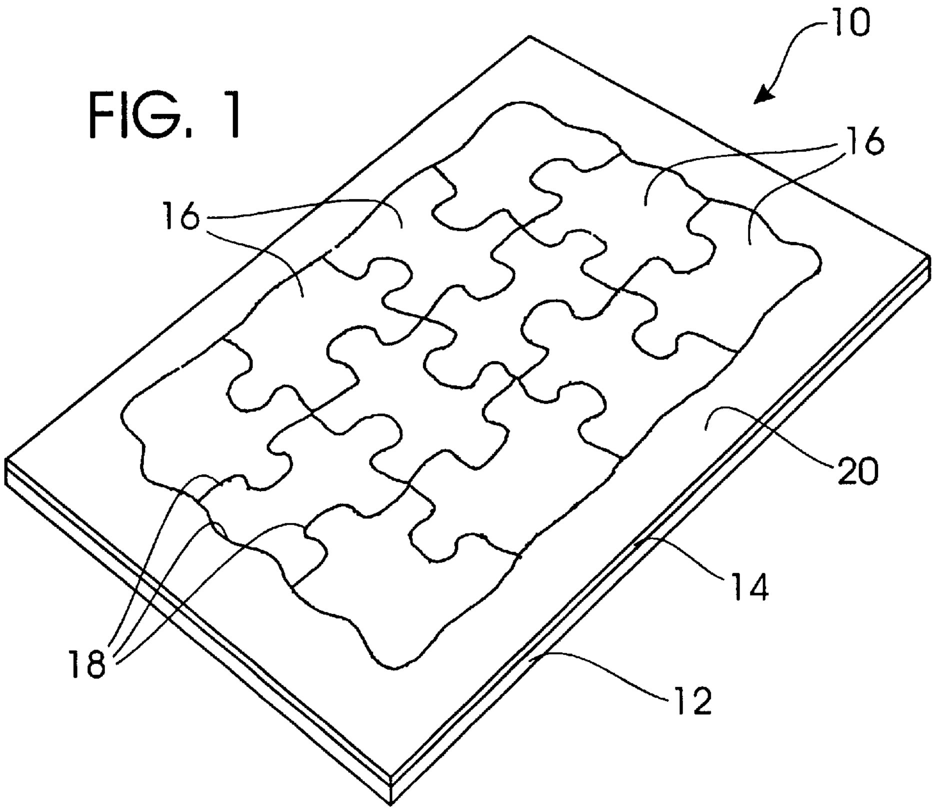
FIG. 1 is an isometric view of a typical puzzle having a board base providing a border with die stamped interlocking puzzle pieces of irregular shape. In the preferred practice of the invention, the puzzle board of FIG. 1 would be one item in a kit that a customer could buy for assembling an individualized puzzle collage.

The invention is preferably practiced by making available to users all of the essentials necessary for the user to make an individualized puzzle collage—that is, by supplying everything required except individual photographs that the user will provide for making the collage. The first and basic item of a kit (as illustrated in FIG. 1) a board puzzle generally indicated by the numeral 10. The board puzzle 10 has the appearance of a standard board puzzle and is usually made of heavy cardboard. The board puzzle typically includes a backing 12 and a front portion 14 that is cut or more typically die stamped to form cuts or channels 18 to form the pieces 16. Surrounding the puzzle pieces 16 as an integral part of front portion 14 is a border 20, the border A being typically secured to backing 12 while the puzzle pieces 16 are not secured and therefore can be individually removed from board 10.

Board puzzle 10 has the appearance of a typical puzzle except that the surfaces of puzzle pieces 16 may or may not have pictures or other printing thereon. The puzzle pieces can be provided with printing or coloring or designs to make the board 10 pleasingly acceptable however, the printing on the front of the cover piece 16 will be irrelevant as to the finished individualized puzzle collage that results from the invention.

Figure 2:
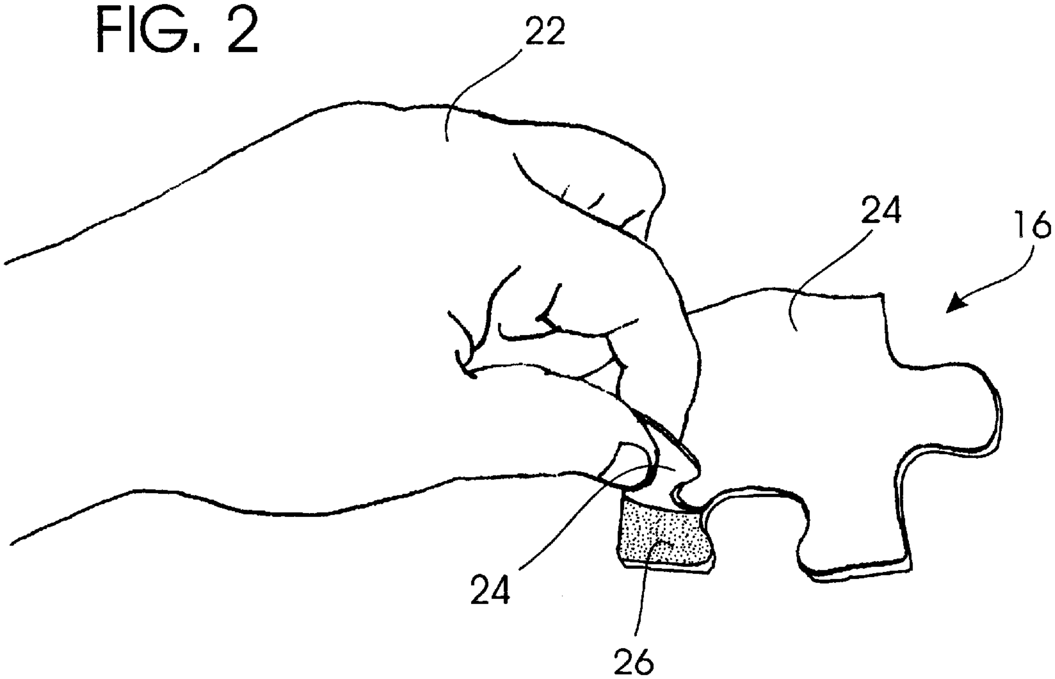
FIG. 2 is an isometric view showing a user pulling a cover film from an adhesive surface of one of the pieces taken from the puzzle of FIG. 1.

Board puzzle 10 is an item manufactured in the same way that similar board puzzles are made today with the exception that the top surface of each puzzle piece is covered with adhesive and over the adhesive is a pull-off film. FIG. 2 shows a puzzle piece 16 having been removed from board puzzle 10, and showing the hand 22 of a user pulling off a cover film 24 from the top surface of the puzzle piece. When the cover film 24 is removed from the top, adhesive covered surface 26 of puzzle piece 16 is fully exposed.

Figure 3:
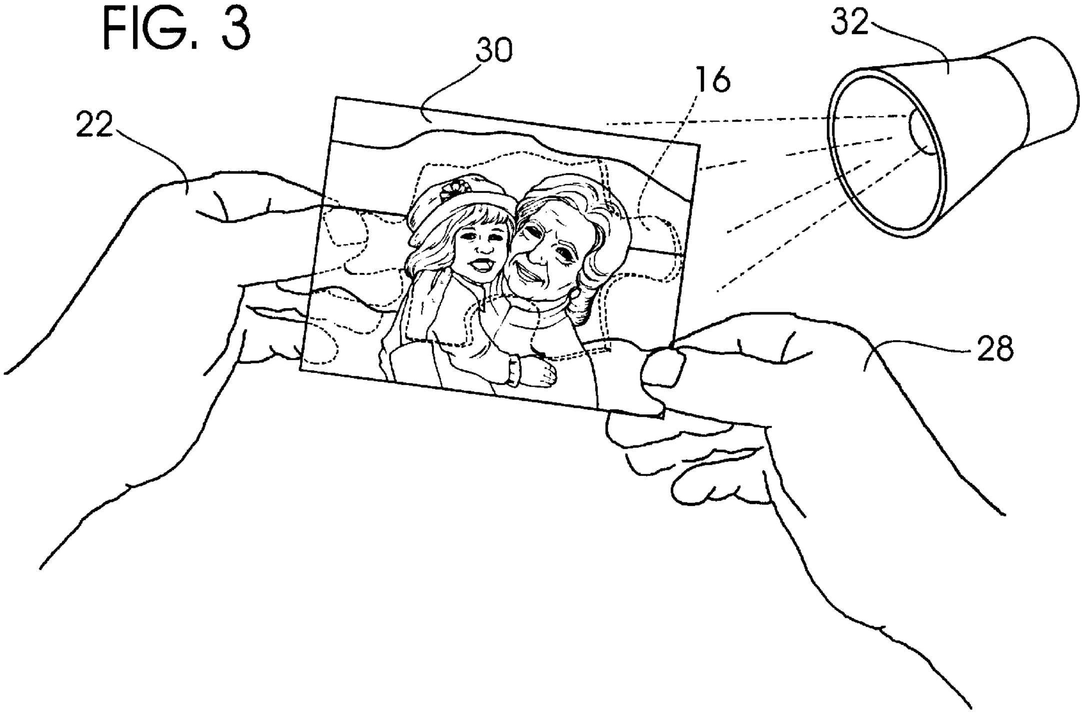
FIG. 3 illustrates a user holding a photograph up to a light and placing the puzzle piece of FIG. 2, having the adhesive cover removed, on the back of the photograph. The light enables the user to know the portion of the photograph that will be within the confines of the outline of the puzzle piece. After the picture is positioned properly with respect to the puzzle piece, the picture is pressed firmly against the puzzle piece, the adhesive serving to secure the puzzle piece to the back of the photograph.

The next step in the method of employing the system of this invention is illustrated in FIG. 3 which shows a left hand 22 and right hand 28 of a user in which user’s left hand is shown holding piece 16 of FIG. 2 with the adhesive covered top surface fully exposed behind a photograph 30 held by the user’s right hand. A light source 32 is shown indicating that with the puzzle piece 16 adjacent to and behind photograph 30 the user can position the photograph with respect to the puzzle piece so that the preferred portion of the photograph is within the boundary of the puzzle piece, the outline of the boundary being made visible through photograph 30 by light source 32. When the user has determined the most desired position of photograph 30 relative to puzzle piece 16, the picture is pressed against the puzzle piece. The adhesive surface of the puzzle securing the puzzle piece to the back of photograph 30.

Figure 4:
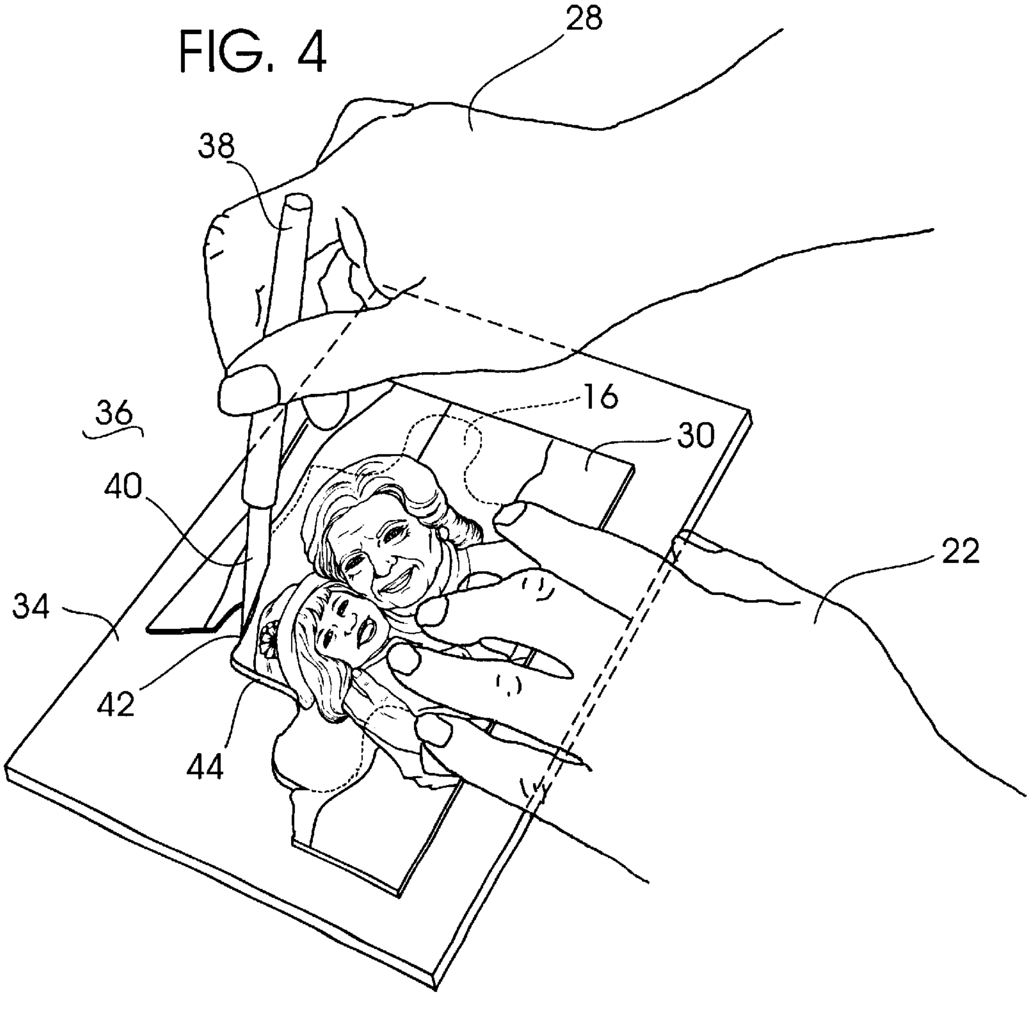
FIG. 4 illustrates a user utilizing a pen knife (commonly known as an “Exacto Knife”) or a similar cutting knife, preferably one having a sharp point, to cut away portions of the photograph exterior to the puzzle piece—that is, cutting the photograph to conform to the shape of the puzzle piece. Cutting is preferably performed on a hard object so that the point of the knife will not penetrate through to cause damage to an underlying surface. For this reason, a kit supplied to a consumer for making an individualized puzzle collage could include a hard surface such as a piece of glass or masonite or other inexpensive material that can be discarded after the individualized puzzle collage is complete.

The next step (as illustrated in FIG. 4) shows the photograph 30 as secured to puzzle piece 16 positioned on a cutting board 34. The cutting board 34 is representative of a firm surface such as a piece of glass, masonite, or any other object that would provide a firm surface to prevent a table surface 36 (on which the cutting board is placed) from being damaged. The user holds the photograph and puzzle piece with his left hand 22 and in his right hand 28 holds a pen knife—that is, a knife having a long handle 38 and a blade 40, the blade preferably having a pointed end 42. The knife, made up of handle 38 and blade 40, is of the type commercially available under the trademark “EXACTO”. This kind of knife is well-known and used by hobbyists, particularly model airplane or model ship builders or for similar purposes in which an artist needs to make fine cuts on an object. Here the knife is used to cut away photograph 30 along the edge 44 of puzzle piece 16. Edge 44 is the edge of the photograph formed when the puzzle board 10 is manufactured and is the same as the cuts or channels 18 as seen in FIG. 1.

Typically in manufactured puzzles, the edge 44 is formed as a die cut. The user draws knife blade 40 along the entire circumferential perimeter of puzzle piece 16 so that the portions of photograph 30 extending exteriorly of the puzzle piece perimeter are fully cut away.

Figure 5:
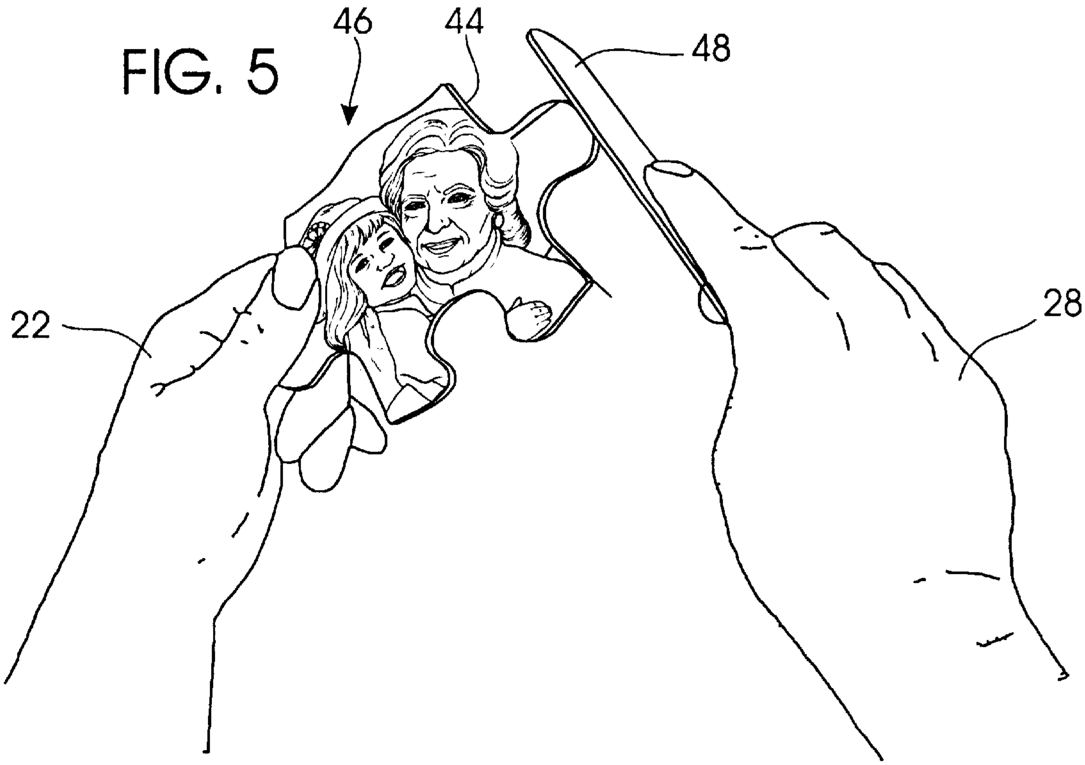
FIG. 5 shows a user shaping the edges of a puzzle piece having a photograph thereon. Shaping is preferably performed utilizing a file such as a fingernail file and particularly utilizing a type of fingernail file that has a form core—that is, a resilient backing, so that the file will readily conform to the edges of the puzzle.

FIG. 4 shows the puzzle piece 16 with its back surface against cutting board 34 as the photograph 30 is trimmed. A better way is to place the photograph 30 against the surface of the cutting board 34 so that knife blade 40 is more easily guided around the edge 44 of the puzzle piece to cut away discarded portions of the photograph. Either way, the puzzle piece will have an appearance (as indicated in FIG. 5) in which the puzzle piece has a portion of a photograph covering the top surface, the photograph being secured in place by adhesive 26 (as seen in FIG. 2). In FIG. 5, numeral 46 indicates a picture covered puzzle piece.

When the excess photograph is removed from the peripheral edge of the puzzle in the step illustrated in FIG. 4, the edge will be sharp—that is, the photograph will be even with or perhaps extend slightly beyond the peripheral edge 44 of the puzzle piece. To shape the picture covered puzzle piece 46, a file 48 is employed. File 48 can be a sandpaper-type file such as a typical fingernail file. A type of fingernail file that is particularly useful is the type that has a foam backing (readily commercially available) so that the surface of the file is somewhat pliable. Further, the file 48 is preferably round or semi-round—that is, not flat. A file having a rounded exterior filing surface works better because of the concave portions of puzzle piece edge 44.

Step 5 is indicative of providing a beveled edge on the picture covered puzzle piece 46 to simulate the normal beveled edge on the typical puzzle piece.

Figure 6:
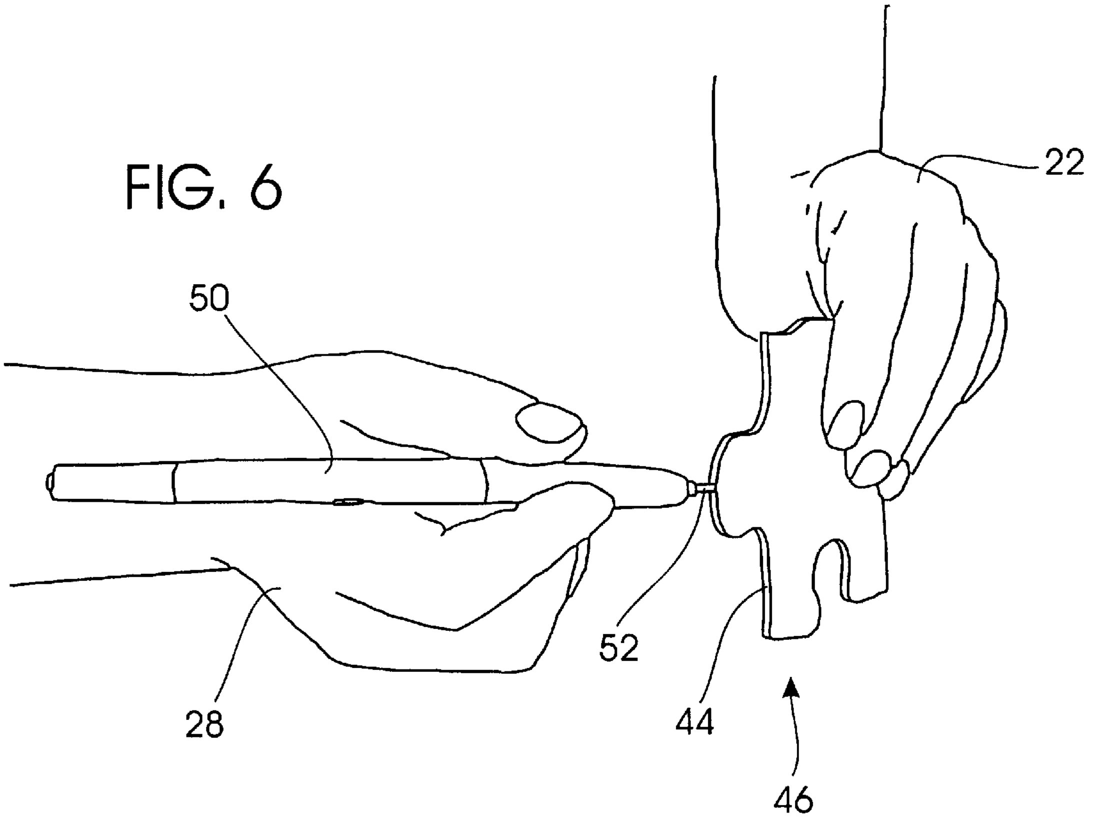
FIG. 6 shows the user coloring the edges, preferably a beveled edge, as formed on the puzzle piece.

After the edge 44 has been beveled around the full periphery, the beveled edge can be colored. Coloring is not a mandatory step but a step that enhances the finished product. FIG. 6 shows the user holding picture covered puzzle piece 46 in his left hand 22 and in his right hand 28 holding a color marker 50 that typically has a felt tip 52. Edge 44 of the picture covered puzzle piece 46 may, in this way, be colored. The edge 44 may be colored white, black or any other color in which felt tip markers 50 are readily available. Coloring the edge 44 of the picture covered puzzle piece is an optional step but is indicative of one that enhances the complete product.

Figure 7:
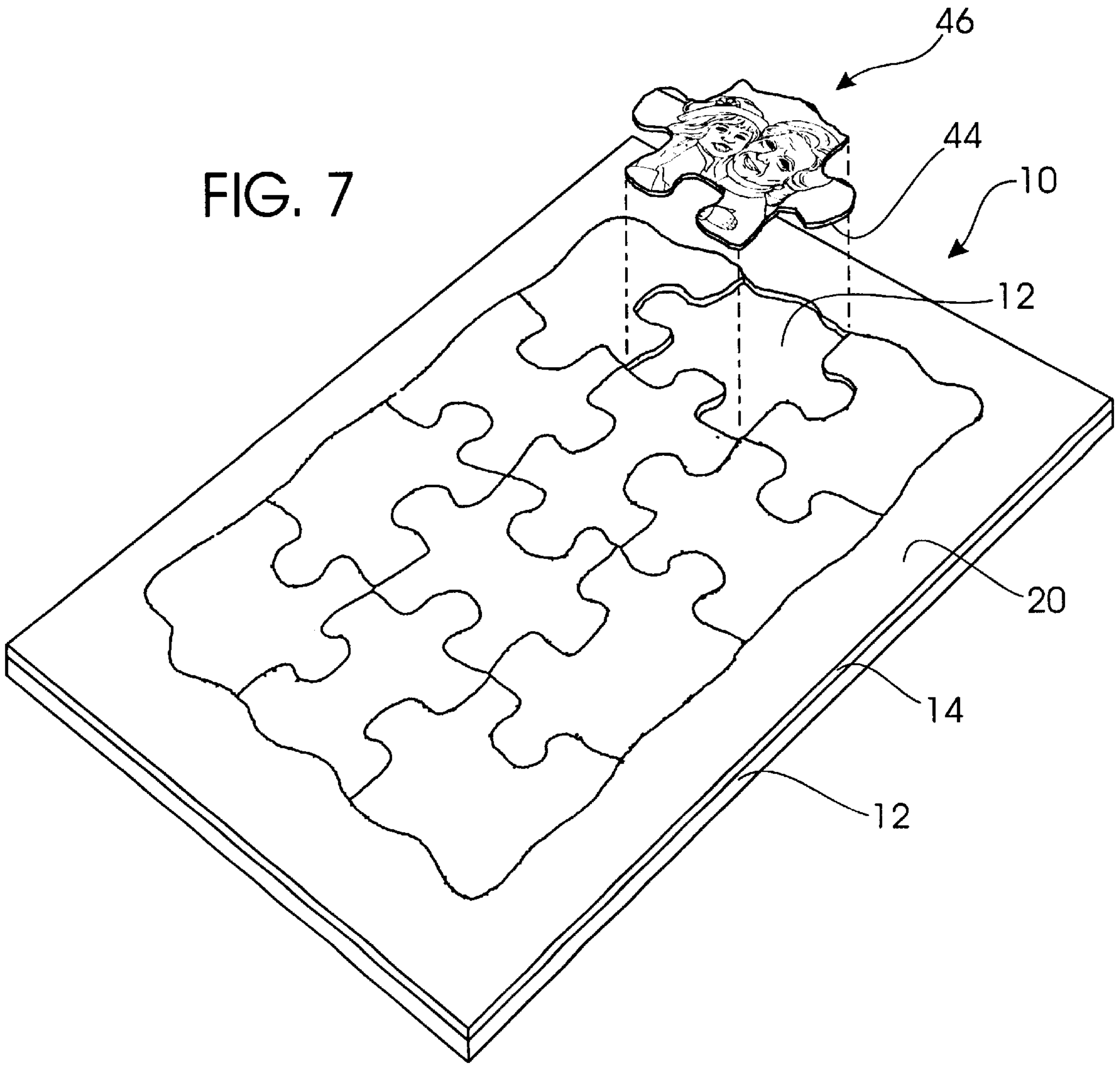
FIG. 7 shows the last step in the process wherein puzzle pieces, each having an individualized photograph thereon are positioned in the puzzle. When all pieces are assembled in the puzzle, the border as provided will present an individualized puzzle collage that will be a truly unique work of art and that may be framed or otherwise displayed.

FIG. 7 shows the completion of the picture covered puzzle piece 46 with the circumferential edge 44 beveled and colored (if that is the desire of the user) and the piece completed and thus, ready to be assembled into the puzzle board within border 20.

Each piece of the puzzle is treated (as shown in the steps of FIGS. 2, 3, 4, 5 and 6) so that each piece has portions of a different photograph thereon. The photographs are assembled by the user to provide, when the project is finished, an individualized picture collage to display scenes that typically have a common theme, such as a wedding, birthday party and so forth or scenes of a place that has been visited such as national park or scenes that represent a vacation or trip. When the project is finished and all pieces of the puzzle have been covered with a picture, the edges beveled and colored and the pieces are assembled back into the puzzle in the sequence (as shown in FIG. 1), the puzzle can be framed or mounted without framing as desired.

Another way of practicing the invention uses the following: an Exacto knife 38; a flat glass of approximate size 8"×8"34; a fingernail file 48; a light source such as house lamp 32; a pencil or pen (not shown); a magic marker 50; puzzle pieces 16; and photos 30. First, select a number of photographs including some extras. All the puzzle pieces are then marked on the back side "top" and numbered 1, 2, 3, etc. Each photo should be marked "top" and numbered to ensure a proper match between the puzzle pieces and the photos. Take a numbered puzzle piece and hold it in front of light source, such as a house lamp, with the adhesive side facing you and the numbered side (or the back side of the puzzle piece) facing the light. Place the photograph on the puzzle piece and adjust the photo on the puzzle piece for proper alignment. After proper alignment is achieved, holding the photo and the puzzle piece together, lay the photo and the puzzle piece down with the photo face down. Then mark the photo on the back side with a pencil or pen on all four corners plus mark the photo on the back side with the puzzle piece number.

After all the photographs have been selected and marked to correspond with the puzzle pieces start with the #1 puzzle piece. Place photo #1 face down on a clear piece of glass. Take puzzle piece #1 and remove the plastic cover from the adhesive side of it. Holding puzzle piece #1 at a slight angle, touch one edge of puzzle piece #1 down, lining up two of the four location marks (made earlier). When puzzle piece #1 is properly lined up, lay it down on the back of the photo. Firmly press down on the puzzle piece to ensure a good bond between the photo and the puzzle piece. Pick up the puzzle piece (the photo is now bonded to puzzle piece). Hold the photo and puzzle piece up to the light source and confirm that the photo is properly positioned. Repeat this process for each photo and puzzle piece.

When all the puzzle pieces have photos attached and bonded to them, take photo and puzzle piece #1 and lay them down on the piece of flat glass with the photo on the bottom, that is, against the glass. Using the knife, lay the edge of the blade against the cardboard edge of the puzzle piece and trace around the puzzle piece with the knife, trimming away the over hanging portions of the photo. When this step is completed, the photograph will have the exact shape of the puzzle piece. Repeat this process for all of the other puzzle pieces.

All the photographs should be in the shape of the puzzle pieces. Sand the edges of the combined photo and puzzle pieces. Holding puzzle piece face up (photo up) sand or roll the edges as illustrated in FIG. 5 of the drawings. This will ensure that the photo bonded to each cardboard puzzle piece will have a smooth, flush finish. The edges of each completed puzzle piece can then be colored using a magic marker as shown in FIG. 6.

The invention has been described in which only one surface of each puzzle piece has an adhesive covered surface 26 (as seen in FIG. 3). In an alternate embodiment of the invention, each puzzle piece 16 can be provided with both a top and a bottom adhesive covered surface. Each of the top and bottom adhesive covered surfaces being covered by a removable cover film 24.

This alternate embodiment of the invention offers two options. In one option, both sides of each puzzle piece are covered with film. The user can follow the process as described with reference to FIGS. 2–7 and before each picture covered puzzle piece 46 is inserted back onto the backing 12 of the board puzzle, the protective film on the bottom surface can be removed so that when each puzzle piece 46 is placed in position, it is permanently secured to backing 12. In this way the completed individualized picture collage will remain intact—that is, no pieces will be removable that could be lost or misplaced. Another option for using the alternate embodiment of the invention is to apply different pictures to the backside of each puzzle piece. In this way, the same puzzle board 10 can be utilized to provide individualized puzzle collages of two completely separate places or events. For instance, if both sides of the puzzle pieces are provided with adhesive the user can place on the front surface pictures relating to one common theme (such as a wedding) and on the back surface pictures relating to a different theme (such as a honeymoon or a vacation trip). In this way, the user can reverse the puzzle pieces and completely change the theme of the individualized puzzle collage. When the second embodiment is used to place photographs on both sides of each puzzle piece, the puzzle itself must be designed so that the puzzle pieces fit when reversed. This can easily be accomplished by making the border edge of the assembled puzzle pieces rectangular rather than curved (as shown in FIG. 1) or the puzzle can be specifically designed so that even with an irregular border (as shown in FIG. 1) the puzzle can be assembled with the pieces reversed to fit back into the border 20 of the puzzle board.

The commercial application of the invention is preferably in the form of a kit that includes the puzzle board of FIG. 1, the pen knife 38, 40 of FIG. 4, a small cutting board 34, a file (particularly a fingernail type sandpaper file 48 and most particularly one having a resilient convex a, surface) and a felt tip marker 50. In this way, everything required except the collection of photographs are together in one kit ready to be employed for making an individualized puzzle collage.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of forming a picture puzzle collage from a plurality of separate individual photographs, each having a picture displaying front surface and a rear surface comprising;

(a) providing a board having a plurality of removable separate mating contiguous puzzle pieces that fit together to cover at least a substantial portion of said board, each separate puzzle piece having a circumferential edge;

(b) removing each of said separate individual puzzle pieces from said board;

(c) removing a film covering from a front surface of each of said separate individual puzzle pieces to expose an adhesive covered front surface of each said separate individual puzzle piece;

(d) affixing a rearward surface of each said separate individual photograph to said adhesive covered front surface of said puzzle piece;

(e) trimming away portions of each of said separate individual photograph photographs extending beyond each of said separate individual puzzle piece's circumferential edge; and (f) replacing said separate individual puzzle pieces each having a trimmed separate individual photograph adhered thereto to said board in a mating contiguous relationship.

2. A method of making a puzzle collage according to claim 1 including, after step (e) the step of shaping said circumferential edges of said separate individual puzzle pieces.

3. A method of making a puzzle collage according to claim 2 including the step of coloring said circumferential edges of said separate individual puzzle pieces after said circumferential edges are shaped.

* * * * *